United States Patent [19]

Brewer

[11] Patent Number: 5,184,416
[45] Date of Patent: Feb. 9, 1993

[54] SIGNAL MOUSETRAP APPARATUS

[76] Inventor: Darryl C. Brewer, P.O. Box 200, Blacksville, W. Va. 26521

[21] Appl. No.: 800,993

[22] Filed: Dec. 2, 1991

[51] Int. Cl.⁵ .......................................... A01M 23/30
[52] U.S. Cl. .......................................... 43/81; 43/98
[58] Field of Search .............. 43/81, 81.5, 82, 83, 43/83.5, 98

[56] References Cited

U.S. PATENT DOCUMENTS

| 1,594,287 | 7/1926 | Wehmann | 43/98 |
| 3,468,054 | 9/1969 | Levine | 43/98 |
| 4,719,718 | 1/1988 | Kon | 43/81 |

FOREIGN PATENT DOCUMENTS 0251903  1/1988  European Pat. Off. ............... 43/98

Primary Examiner—Kurt C. Rowan
Attorney, Agent, or Firm—Leon Gilden

[57] ABSTRACT

A mousetrap apparatus is arranged to include a plurality of contact bosses mounted fixedly to a mousetrap assembly base, whereupon tripping of the mousetrap bail effects electrical communication between the mousetrap boss members to provide indication of a mousetrap bail in an actuated orientation relative to the mousetrap assembly.

4 Claims, 4 Drawing Sheets

SIGNAL MOUSETRAP APPARATUS

BACKGROUND OF THE INVENTION

1. Field of the Invention

The field of invention relates to mousetrap apparatus, and more particularly pertains to a new and improved mousetrap apparatus wherein the same is arranged to effect indication of the tripping and actuation of associated mousetrap assembly.

2. Description of the Prior Art

Mousetrap apparatus of various types are utilized throughout the prior art and are exemplified in U.S. Pat. No. 4,641,456 to Bohrski whereupon stepping upon a mousetrap floor of the organization provides a trip plate activated by a solenoid of a main circuit by the presence of a mouse pushes a mouse relative to the mousetrap organization for a trapping of a mouse.

U.S. Pat. No. 4,662,101 to Fisher sets forth a mousetrap organization wherein a pivoting platform directs a mouse into a lowermost end of a container under the pivoting platform.

U.S. Pat. No. 4,803,799 to Vajs, et al. sets forth a striker member biased by spring actuation to secure a mouse in an enclosed housing.

As such, it may be appreciated that there continues to be a need for a new and improved mousetrap apparatus as set forth by the instant invention which addresses both the problems of ease of use as well as effectiveness in construction in permitting ease of indication of a mouse secured relative to a mousetrap assembly and in this respect, the present invention substantially fulfills this need.

SUMMARY OF THE INVENTION

In view of the foregoing disadvantages inherent in the known types of mousetrap apparatus now present in the prior art, the present invention provides a mousetrap apparatus wherein the same is arranged to provide for indication of tripping of a mousetrap bail member. As such, the general purpose of the present invention, which will be described subsequently in greater detail, is to provide a new and improved mousetrap apparatus which has all the advantages of the prior art mousetrap apparatus and none of the disadvantages.

To attain this, the present invention provides a mousetrap apparatus arranged to include a plurality of contact bosses mounted fixedly to a mousetrap assembly base, whereupon tripping of the mousetrap bail effects electrical communication between the mousetrap boss members to provide indication of a mousetrap bail in an actuated orientation relative to the mousetrap assembly.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved mousetrap apparatus which has all the advantages of the prior art mousetrap apparatus and none of the disadvantages.

It is another object of the present invention to provide a new and improved mousetrap apparatus which may be easily and efficiently manufactured and marketed.

It is a further object of the present invention to provide a new and improved mousetrap apparatus which is of a durable and reliable construction.

An even further object of the present invention is to provide a new and improved mousetrap apparatus which is susceptible of a low cost of manufacture with regard to both materials and labor, and which accordingly is then susceptible of low prices of sale to the consuming public, thereby making such mousetrap apparatus economically available to the buying public.

Still yet another object of the present invention is to provide a new and improved mousetrap apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
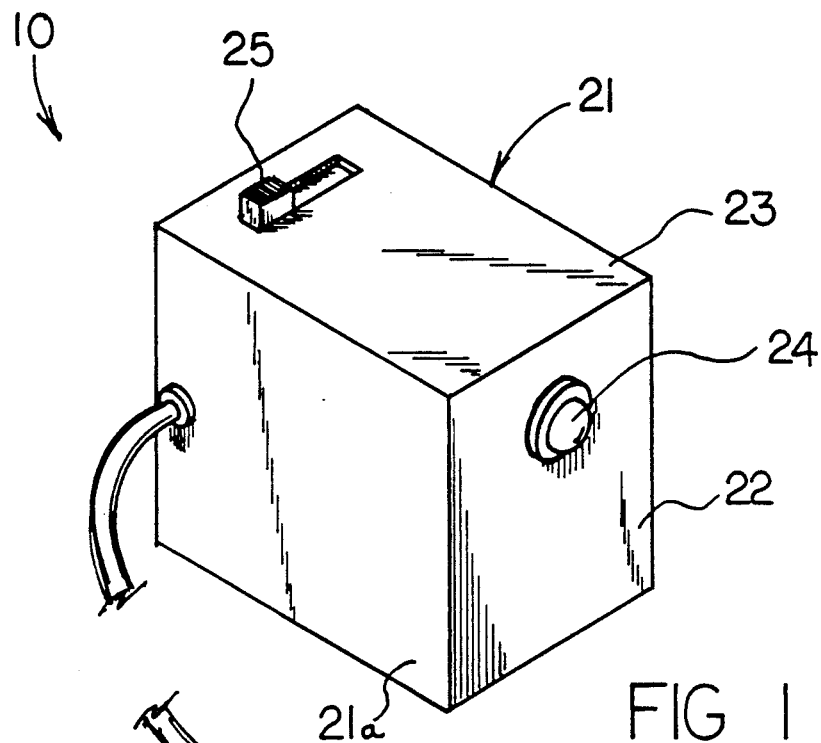
FIG. 1 is an isometric illustration of the signal housing of the instant invention.

With reference now to the drawings, and in particular to FIGS. 1 to 10 thereof, a new and improved mousetrap apparatus embodying the principles and concepts of the present invention and generally designated by the reference numeral 10 will be described.

Figure 2:
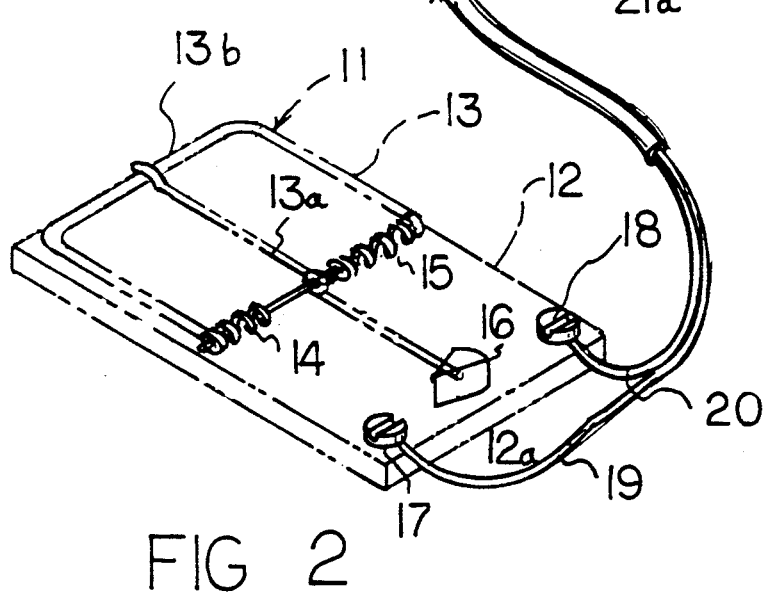
FIG. 2 is an isometric illustration of the mousetrap assembly utilized by the invention.
Figure 3:
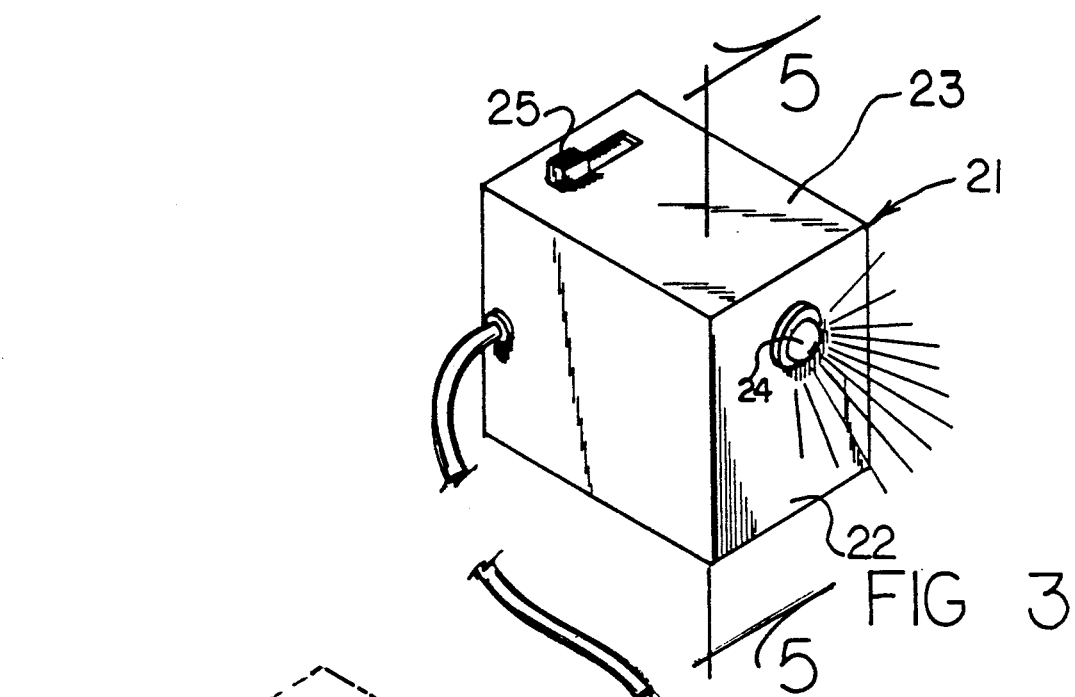
FIG. 3 is an isometric illustration of the mousetrap housing with the housing in an actuated orientation.
Figure 4:
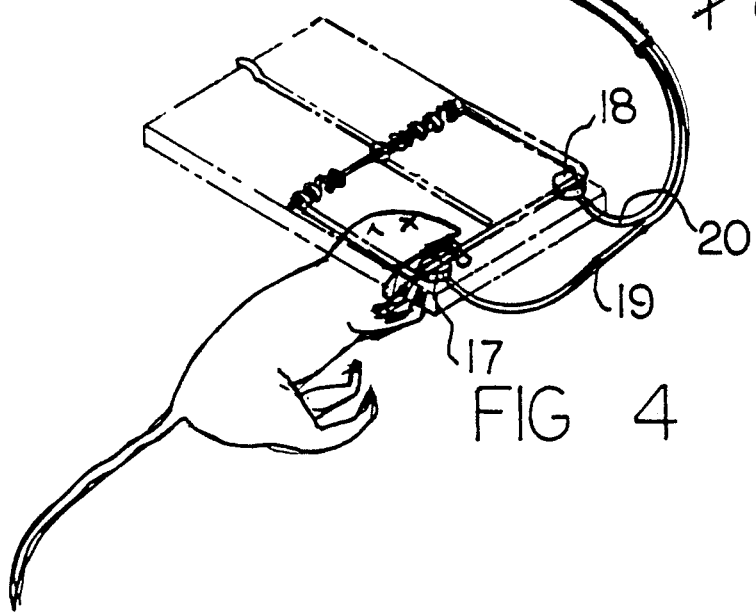
FIG. 4 is an isometric illustration of the mousetrap assembly in an actuated orientation.

More specifically, the mousetrap apparatus 10 of the instant invention essentially comprises a mousetrap assembly 11, such as illustrated in FIG. 2, cooperative with a signal housing 21, as illustrated in FIG. 1. The mousetrap assembly 11 includes a base plate 12, with a "U" shaped bail 13 pivotally mounted about an axle 14 fixedly mounted to a top surface of the base plate 12, with an axle spring 15 biasing the "U" shaped bail 13 upon disengagement with a trigger leg 13a into orientation to a forward edge 12a of the base plate 12. A bait cup 16 of any desired configuration is arranged spaced from the forward edge 12a to receive a portion of bait thereon. The organization includes a respective first and second contact boss 17 and 18 of electrically transmissive material fixedly mounted to the base plate 12 adjacent the forward edge 12a and spaced from the axle 14 a predetermined length substantially equal to a predetermined length defined by the axle 14 to the base leg 13b of the "U" shaped bail 13, whereupon actuation of the "U" shaped bail or release relative to the trigger leg 13a effects electrical communication between the first and second contact bosses 17 and 18. A first and second electrical transmission line 19 and 20 respectively effects electrical communication between the first and second bosses 17 and 18 with the associated signal housing 21.

Figure 5:
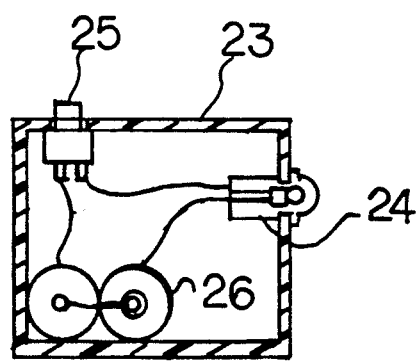
FIG. 5 is an orthographic view, taken along the lines 5—5 of FIG. 3 in the direction indicated by the arrows.
Figure 6:
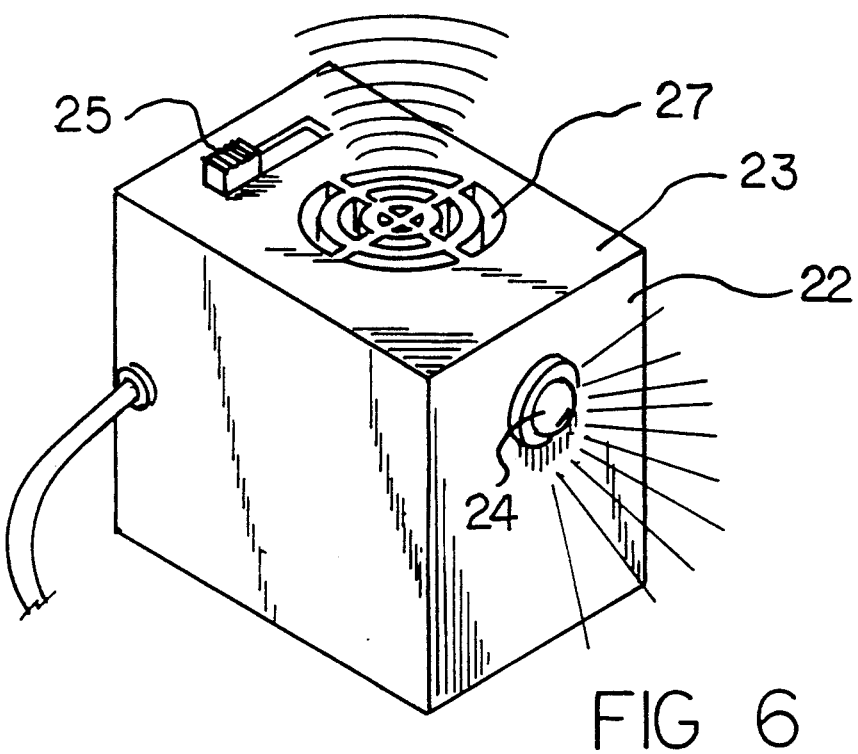
FIG. 6 is an isometric illustration of a modified housing of the instant invention.
Figure 7:
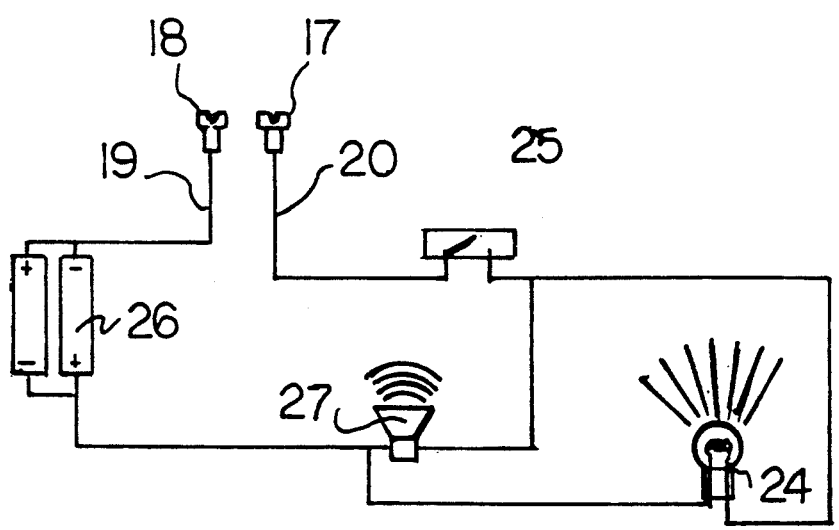
FIG. 7 is a diagrammatic illustration of the modified mousetrap member of the invention.

The signal housing 21 includes housing side walls 21a, a housing front wall 22, and a housing top wall 23. A visual signal light 24 is directed through the front wall, with a housing switch 25 directed through the top wall. Reference to FIG. 5 for example illustrates the use of batteries 26 within the housing to effect electrical communication to an associated visual signal light 24. A modified housing, as illustrated in FIG. 6, includes an audio signal speaker 27 in association with the visual illumination signal light 24. FIG. 7 illustrates a diagrammatic illustration wherein the housing switch 25 when in a closed orientation permits actuation of the audio and visual signals 27 and 24 respectively upon the first and second contact bosses 17 and 18 effecting communication as the second switch when the base leg 13b effects electrical communication between the first and second contact bosses 17 and 18.

Figure 8:
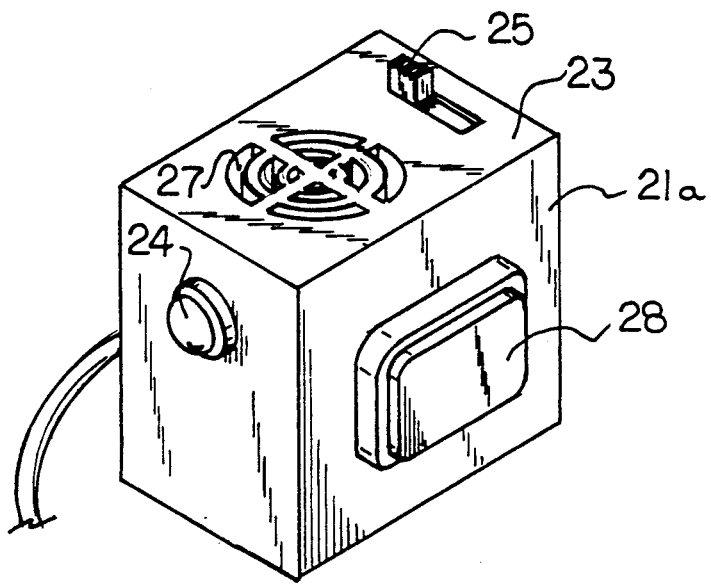
FIG. 8 is an isometric illustration of a further modified housing of the instant invention.
Figure 9:
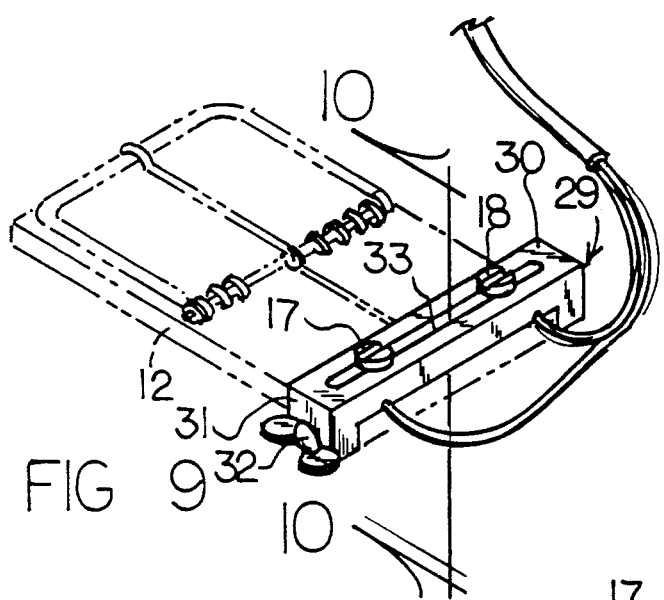
FIG. 9 is an isometric illustration of a modified mounting assembly secured to a mousetrap assembly of the instant invention.
Figure 10:
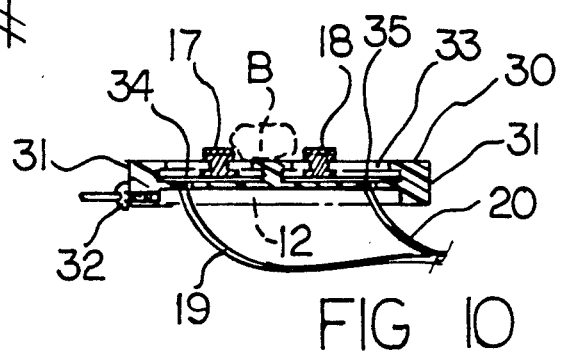
FIG. 10 is an orthographic view, taken along the lines 10—10 of FIG. 9 in the direction indicated by the arrows.

The FIG. 8 illustrates the housing 21 including a magnet member 28 fixedly mounted to a side wall 21a projecting exteriorly thereof permitting securement of the housing in a selective fixed orientation relative to a ferrous metallic support surface (not shown). The first and second contact bosses 17 and 18 are positioned within a mounting plate 29 that is of a generally "U" shaped configuration and secured to the base plate 12 adjacent the forward edge 12a. The mounting plate 29 includes a top wall 30 and spaced parallel side walls 31, with a fastener rod 32 orthogonally directed rotatably through one of the side walls 31 for engagement with the base plate 12 to permit fastening of the mounting plate 29 thereto. A top wall slot 33 orthogonally oriented between the side walls 31 directed through the top wall 30 slidably receives the first and second contact bosses 17 and 18 in a spaced relationship within the slot overlying a respective first and second contact boss plate 34 and 35 respectively that are in electrical communication with the respective first and second electrical transmission lines 19 and 20. In this manner, the contact bosses may be displaced to secure a portion of bait "B" therebeween to more readily and properly orient the bait relative to the contact bosses 17 and 18.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mousetrap apparatus, comprising in combination, a mousetrap assembly, the mousetrap assembly including a base plate with the base plate forward edge and a "U" shaped bail pivotally mounted medially of the base plate, the "U" shaped bail mounted about a axle, with the axle fixedly mounted to the base plate, and an axle spring biasing the "U" shaped bail to a first position, with the "U" shaped bail including a base leg, and the base leg oriented adjacent the forward edge in the first position, and a first contact boss and a second contact boss mounted relative to the base plate adjacent the forward edge, and the first contact boss and the second contact boss spaced from the axle a predetermined length, and the axle spaced from the base leg a further predetermined length, wherein the further predetermined length is equal to the predetermined length, and a signal housing, the signal housing including at least one battery contained therewithin, and a visual signal light mounted to the housing projecting exteriorly thereof, and a first electrical transmission line and a second electrical transmission line mounted to the respective first and second contact boss in electrical communication with the at least one battery, whereupon actuation of the "U" shaped bail to the first position in contiguous communication with the first and second contact bosses effects illumination of the signal light.

2. An apparatus as set forth in claim 1 including an audio signal speaker mounted through the housing in electrical communication with the at least one battery, and a housing switch, the housing switch mounted to the housing, wherein the housing switch is in electrical communication between the at least one battery, the visual signal light, the audio signal speaker, and the first and second contact boss.

3. An apparatus as set forth in claim 2 including a magnet member mounted to the housing projecting exteriorly thereof to permit securement of the housing to a ferrous metallic support.

4. An apparatus as set forth in claim 3 wherein the first and second contact boss are mounted within a mounting plate, the mounting plate including a top wall and spaced side walls, the mounting plate defining a "U" shaped configuration receiving the base plate therewithin, with the mounting plate positioned adjacent the forward edge of the base plate, and a fastener rod directed through at least one side wall in communication with the base plate to permit selective securement of the mounting plate to the base plate, and the top wall including a top wall slot, the first and second contact boss slidably mounted within the top wall slot, and the first contact boss slidably mounted in contiguous communication with a first contact base plate within the mounting plate, and the second contact boss slidably mounted in contiguous communication with a second contact base plate within the mounting plate, and the first electrical transmission line in electrical communication with the first contact base plate and the second electrical transmission line in electrical communication with the second contact base plate.

* * * * *